United States Patent
Ma et al.

(10) Patent No.: US 6,950,169 B2
(45) Date of Patent: Sep. 27, 2005

(54) VERTICAL ALIGNMENT MODE LIQUID CRYSTAL DISPLAY DEVICE HAVING PIXEL ELECTRODE PARTIALLY COVERING HOLES OF THE INSULATING FILM

(75) Inventors: Jung Ho Ma, Kyoungki-do (KR); Seung Ho Hong, Kyoungki-do (KR)

(73) Assignee: Boe-Hydis Technology Co., Ltd., Kyoungki-do (KR)

( * ) Notice: Subject to any disclaimer, the term of this patent is extended or adjusted under 35 U.S.C. 154(b) by 2 days.

(21) Appl. No.: 10/602,957

(22) Filed: Jun. 24, 2003

(65) Prior Publication Data

US 2004/0070715 A1 Apr. 15, 2004

(30) Foreign Application Priority Data

Jun. 29, 2002 (KR) ................ 10-2002-0037596

(51) Int. Cl.[7] ............ G02F 1/1343; G02F 1/1337
(52) U.S. Cl. .............. 349/146; 349/130; 349/138; 349/143
(58) Field of Search ................ 349/122, 130, 349/138, 143, 146

(56) References Cited

U.S. PATENT DOCUMENTS

| | | | | | |
|---|---|---|---|---|---|
| 5,805,250 | A | * | 9/1998 | Hatano et al. | ............. 349/96 |
| 6,147,722 | A | * | 11/2000 | Shimada et al. | ............. 349/43 |
| 6,344,888 | B2 | * | 2/2002 | Yasukawa | ............. 349/113 |
| 6,466,296 | B1 | * | 10/2002 | Yamada et al. | ............. 349/160 |
| 6,512,561 | B1 | * | 1/2003 | Terashita et al. | ............. 349/118 |
| 6,567,144 | B1 | * | 5/2003 | Kim et al. | ............. 349/128 |
| 6,570,636 | B2 | * | 5/2003 | Kim et al. | ............. 349/130 |
| 6,600,539 | B2 | * | 7/2003 | Song | ............. 349/130 |
| 6,621,550 | B1 | * | 9/2003 | Arakawa et al. | ............. 349/178 |
| 6,657,695 | B1 | * | 12/2003 | Song et al. | ............. 349/143 |

OTHER PUBLICATIONS

Kataoka et al., "39.4: A New MVA–LCD with Jagged Shaped Pixel Electrodes", SID Digest 2001, pp. 1066–1069.*

* cited by examiner

*Primary Examiner*—Andrew Schechter
(74) *Attorney, Agent, or Firm*—Ladas & Parry LLP

(57) ABSTRACT

Disclosed herein is a vertical alignment liquid crystal display device with high-speed response. This vertical alignment liquid crystal display device comprises: upper and lower substrates which are disposed opposite one another at the desired interval; a liquid crystal layer sandwiched between the upper and lower substrates and formed of liquid crystals with negative dielectric anisotropy; an insulating film formed on the inner surface of the lower substrate and having a hole formed therein; a jagged pixel electrode which is formed on the insulating film in such a manner that the pixel electrode covers more than half of the hole; a counter electrode which is formed on the inner surface of the upper electrode; vertical alignment films which are interposed between the pixel electrode and the liquid crystal layer and between the counter electrode and the liquid crystal layer, respectively; and polarizers which are attached on the outer surfaces of the upper and lower substrates, respectively, in such a manner that their polarizing axes cross each other.

10 Claims, 7 Drawing Sheets

VERTICAL ALIGNMENT MODE LIQUID CRYSTAL DISPLAY DEVICE HAVING PIXEL ELECTRODE PARTIALLY COVERING HOLES OF THE INSULATING FILM

BACKGROUND OF THE INVENTION

1. Field of the Invention

The present invention relates to a liquid crystal display, and more particularly, to a vertical alignment mode liquid crystal display device with high-speed response.

2. Description of the Prior Art

As well known in the art, a vertical alignment mode liquid crystal display was proposed to improve the viewing angle and response speed properties of a twisted nematic mode liquid crystal display.

Although not shown in the accompanying figures, in this vertical alignment mode liquid crystal display, a liquid crystal layer formed of liquid crystals with negative dielectric anisotropy is sandwiched between upper and lower electrodes, each having a liquid crystal driving electrode. Also, vertical alignment films are disposed on the inner surfaces of the upper and lower substrates, respectively. And polarizers are attached to the outer surfaces of the upper and lower substrates, respectively, in such a manner that their polarizing axes cross each other.

However, in this vertical alignment mode liquid crystal display, the liquid crystals have refractive index anisotropy due to their a rod-like shape of liquid crystal molecules, and for this reason, the screen image of the display vary depending on its viewing angle. For example, before application of an electric field, all the liquid crystals are aligned in a direction perpendicular to the substrates, and thus, on the front of the screen, complete darkness is achieved but on the side of the screen, light is leaked to cause deterioration in image quality.

Thus, in order to compensate for the deterioration of image quality caused by the refractive index anisotropy of the liquid crystals, there was proposed a structure wherein the electric field is distorted to align the liquid crystals in four directions, thereby improving the viewing angle.

For example, U.S. Pat. No. 6,288,762 discloses a structure in which protrusions serving to distort the electric field are formed on substrates. This structure is shown in FIG. 1.

As shown in FIG. 1, a lower substrate 11 and an upper substrate 12 are disposed opposite one another while interposing liquid crystal molecules 13 therebetween. Protrusions 14 are formed on the inner surface of each of the lower substrate 1 and the upper surface 12.

In this structure, an electric field is distorted around the protrusions 14 upon its application such that the liquid crystals 13 are symmetrically aligned. As a result, there are formed a multi-domain of the liquid crystal molecules. This compensates for the deterioration of image quality caused by the refractive index anisotropy of the liquid crystals.

In another attempt to distort the electric field, there was proposed a method in which a liquid crystal driving electrode with slits is used in place of the protrusions. The structure utilizing this liquid crystal driving electrode is shown in FIG. 2, and the principal of operation of this structure equals to that of the protrusions. In FIG. 2, the reference numeral 21 designates a lower substrate, the reference numeral 22 designates an upper substrate, the reference numerals 23 and 24 designate a liquid crystal driving electrode with silts, and the reference numeral 25 designates slits.

However, in the vertical alignment mode liquid crystal display utilizing the protrusion or slit structure, the protrusions or slits serve as a kind of tilting sources in driving the liquid crystals. As shown in FIGS. 3A and 3B, it can be found that, as the interval between the slits 36 is reduced, namely as the number of the slits is increased, the response time of the liquid crystals is shortened. This phenomenon is likewise observed in the structure having the protrusions.

In FIGS. 3A and 3B, the reference numeral 31 designates a lower substrate, the reference numeral 32 designates an upper substrate, the reference numerals 33 and 34 designate a liquid crystal driving electrode, the reference numeral 35 designates liquid crystals, and the reference numeral 36 designates slits.

However, if the tilting sources are increased in order to shorten the response time of the liquid crystals, namely if the number of the protrusions or slits is increased, the increase of disclination lines on a display screen is caused to reduce transmittance. In addition, in this case, deteriorations in properties, such as increases in response time and driving voltage, are caused.

Meanwhile, in order to solve these problems, a jagged liquid crystal driving electrode was proposed by Fujitsu, Co., Japan, in SID 2001 Digest, page 1066. The structure of this proposed electrode is shown in FIGS. 4A and 4B. Referring to FIGS. 4A and 4B, a liquid crystal driving electrode, i.e., a pixel electrode 43, in a lower substrate 41, is formed into a jagged shape, and an upper substrate 42 is provided with protrusions 44. In this structure, although there is an additional titling source between the protrusion and the slit, this tilting source does not serve to make the liquid crystals symmetrically tilted, so that it does not cause the disclination lines.

However, this structure ultimately has the tilting sources consisting of the protrusions and the slits, which are formed on the lower substrate and the upper substrate, respectively. For this reason, if the complete alignment of liquid crystal molecules upon assembling of the substrates is not achieved, it is difficult for the liquid crystals to be stably driven.

SUMMARY OF THE INVENTION

Accordingly, the present invention has been made to solve the above-mentioned problems occurring in the prior art, and an object of the present invention is to provide a vertical alignment mode liquid crystal display device allowing the high-speed response of liquid crystal molecules.

To achieve the above object, the present invention provides a vertical alignment mode liquid crystal display device which comprises: upper and lower substrates which are disposed opposite one another at the desired interval; a liquid crystal layer sandwiched between the upper and lower substrates and formed of liquid crystals with negative dielectric anisotropy; an insulating film formed on the inner surface of the lower substrate and having a hole formed therein; a jagged pixel electrode which is formed on the insulating film in such a manner that the pixel electrode covers more than half of the hole; a counter electrode which is formed on the inner surface of the upper electrode; vertical alignment films which are interposed between the pixel electrode and the liquid crystal layer and between the counter electrode and the liquid crystal layer, respectively; and polarizers which are attached on the outer surfaces of the upper and lower substrates, respectively, in such a manner that their polarizing axes cross each other.

Preferably, the hole is a rectangular hole, which has a height of less than 2 $\mu$m, a length of shorter side of 5 $\mu$m, and a wall angle of 10–90 degrees.

Furthermore, the pixel electrode is formed in such a manner that the ratio between a portion of the hole covered with the pixel electrode and a portion of the hole non-covered with the pixel electrode is 1:1–5:1. Moreover, the pixel electrode is formed in such a manner that the interval between two adjacent pixel electrodes is less than 10 μm.

According to the present invention, a plurality of titling sources, which allow liquid crystals to be unsymmetrically tilted, are provided in the lower substrate, so that the response time of liquid crystals can be shortened, and also transmittance and a margin in assembling the upper and lower substrates can be increased.

BRIEF DESCRIPTION OF THE DRAWING

The above and other objects, features and advantages of the present invention will be more apparent from the following detailed description taken in conjunction with the accompanying drawings, in which.

DETAILED DESCRIPTION OF PREFERRED EMBODIMENTS

Although not shown in the accompanying drawings, in a vertical alignment mode liquid crystal display according to the present invention, lower and upper substrates each having liquid crystal driving electrode made of indium tin oxide (ITO), i.e., a pixel electrode and a counter electrode, are assembled while a liquid crystal layer made of plural liquid crystal molecules having negative anisotropy is confined between the upper and lower substrates. Also, vertical alignment films are interposed between the lower substrate and the liquid crystal layer and between the upper substrate and the liquid crystal layer, respectively, and polarizers are attached on the respective outer surfaces of the substrates in such a manner that their polarizing axes cross each other.

In this vertical alignment mode liquid crystal display according to the present invention, an insulating film including a resin film is applied on the lower substrate on which a thin film transistor was formed. This insulating film has a hole formed therein, and on the insulating film, a jagged pixel electrode is formed such that it partially covers the hole of the insulating film.

Figure 1:
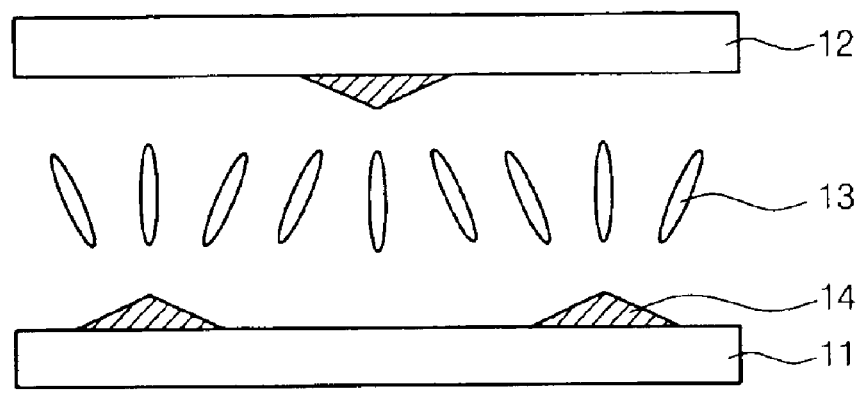
FIG. 1 is a cross-sectional view of a vertical alignment mode liquid crystal device utilizing protrusions according to the prior art.
Figure 2:
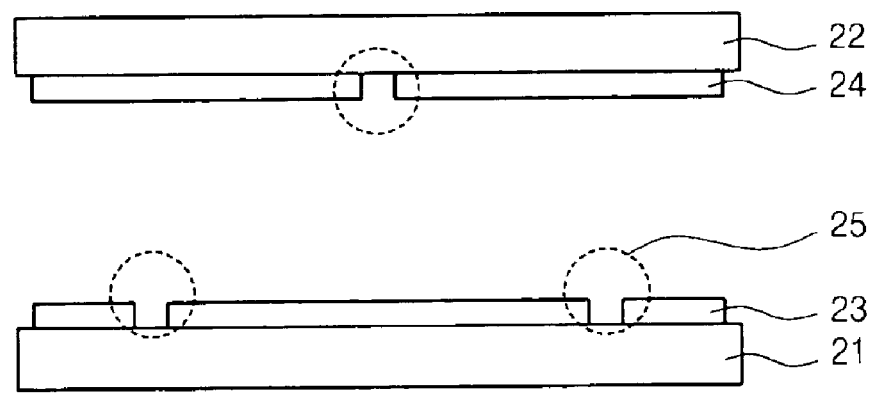
FIG. 2 is a cross-sectional view of a vertical alignment mode liquid crystal device utilizing slits according to the prior art.
Figure 3A:
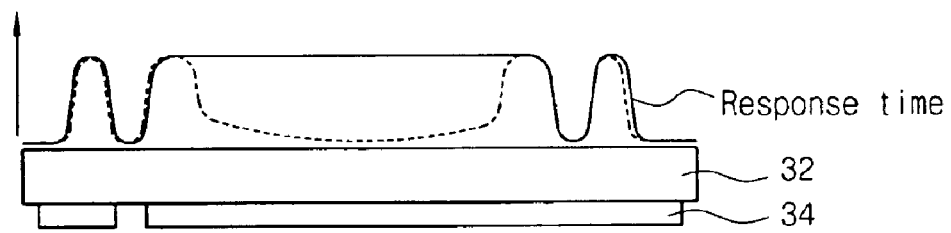
FIGS. 3A and 3B show changes in response time and transmittance according to the number per unit length of sources for tilting liquid crystals.
Figure 3A:
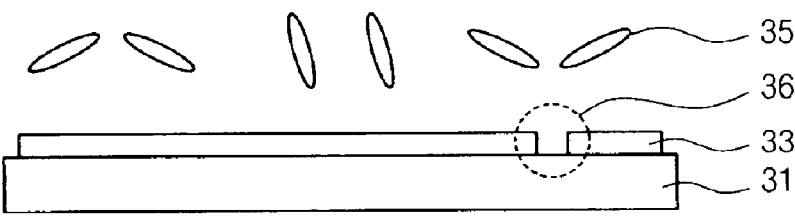
Figure 3B:
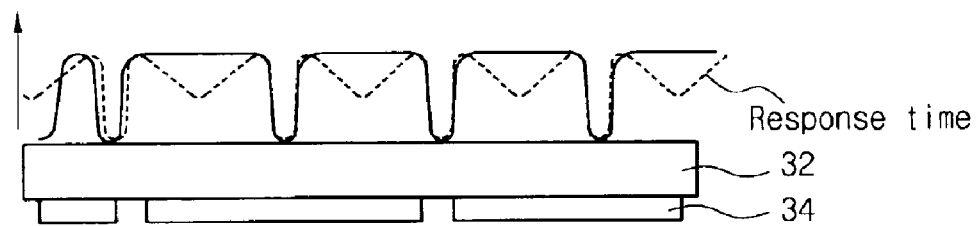
Figure 3B:
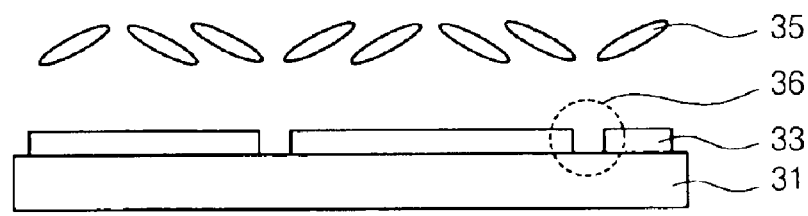
Figure 4A:
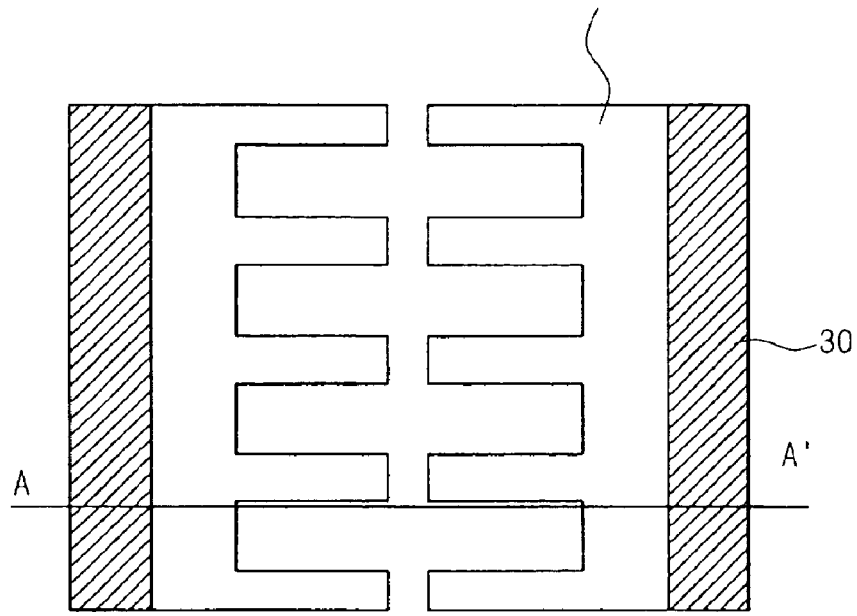
FIGS. 4A and 4B show a vertical alignment mode liquid crystal display device utilizing a jagged pixel electrode and a protrusion according to the prior art.
Figure 4B:
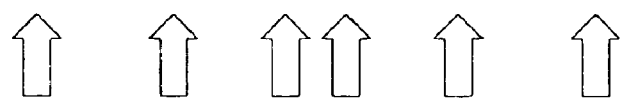
Figure 4B:
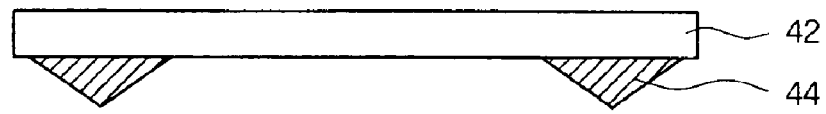
Figure 4B:
Figure 4B:
Figure 5A:
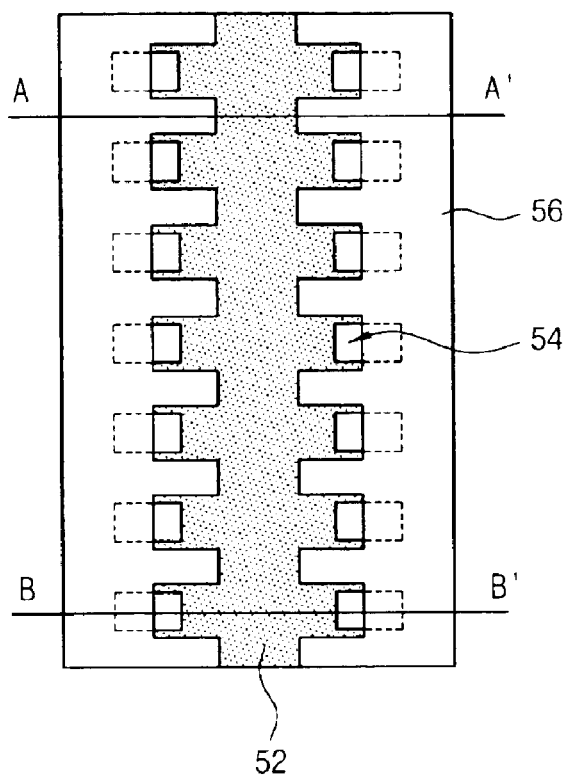
FIGS. 5A to 5C show the structure of a lower substrate in a vertical alignment mode liquid crystal display device according to an embodiment of the present invention.
Figure 5B:
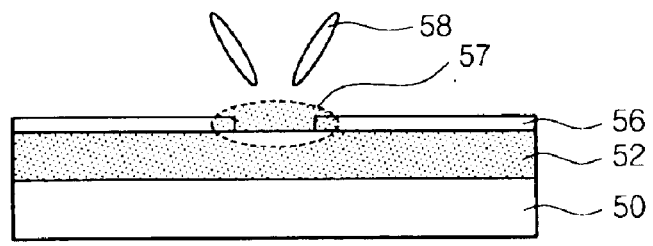
Figure 5C:
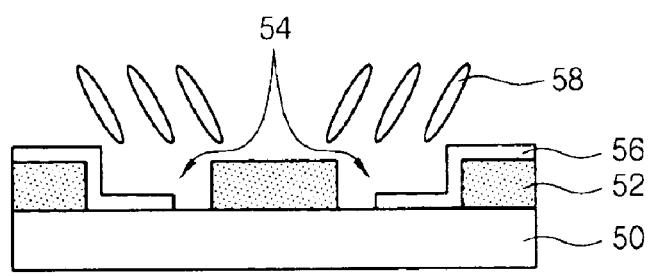

Specifically, FIGS. 5A to 5C are drawings illustrating a vertical alignment mode liquid crystal display according to a preferred embodiment of the present invention. FIG. 5A is a top view showing the structure of a lower substrate, FIG. 5B is a cross-sectional view taken along the line A–A' of FIG. 5A, and FIG. 5C is a cross-sectional view taken along the line B–B' of FIG. 5A.

As shown in FIGS. 5A to 5C, an insulating film 52 having a hole 54 is formed on a lower substrate 50, and on the resulting insulating film 52, a jagged pixel electrode 56 made of indium tin oxide (ITO) is formed in such a manner that it is overlapped with a portion of the hole 54.

In this case, the hole 54 is preferably a rectangular hole, which has a height of less than 2 μm, a length of shorter side of less than 5 μm, and a wall angle of 10–90 degrees.

The pixel electrode is formed into a jagged shape in such a manner that the ratio between a portion of the hole covered with the pixel electrode and a portion of the hole non-covered with the pixel electrode is preferably 1:1–5:1, and the interval between two adjacent pixel electrodes is less than 10 μm.

Figure 6A:
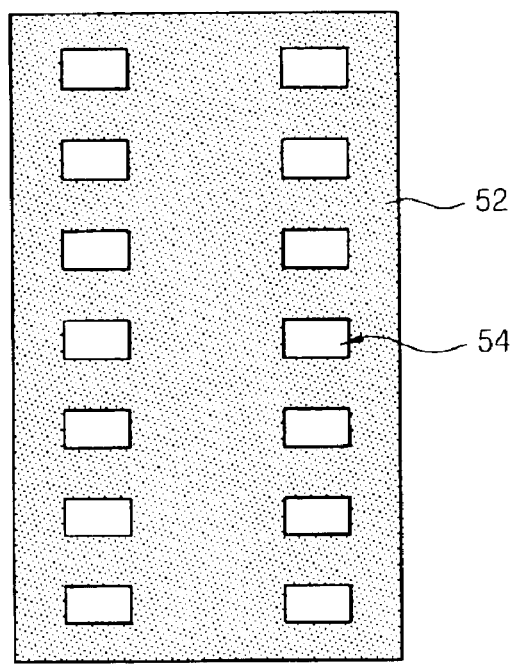
FIGS. 6A and 6B show the structures of a hole and an electrode according to an embodiment of the present invention.
Figure 6B:
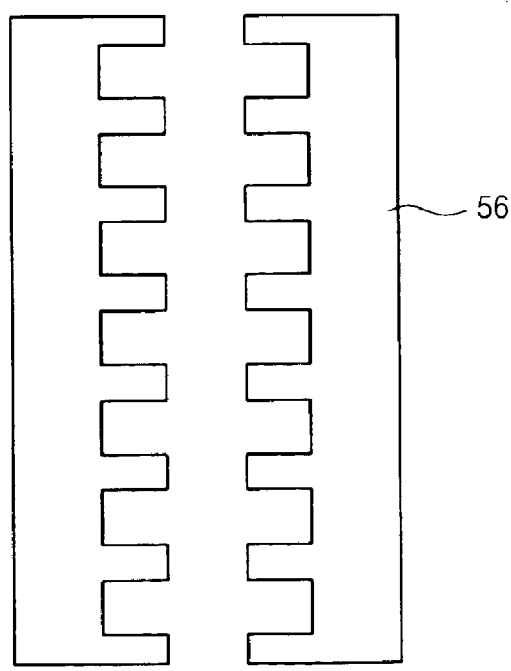

More specifically, the insulating film 52 includes a resin film, and as shown in FIG. 6A, has a hole 54 formed according to a conventional photolithographic process. As shown in FIG. 6B, the pixel electrode 56 is formed into a jagged shape, and particularly, it is formed such that it is overlapped with more than half of the hole 54 while being formed on the insulating film.

Figure 7:
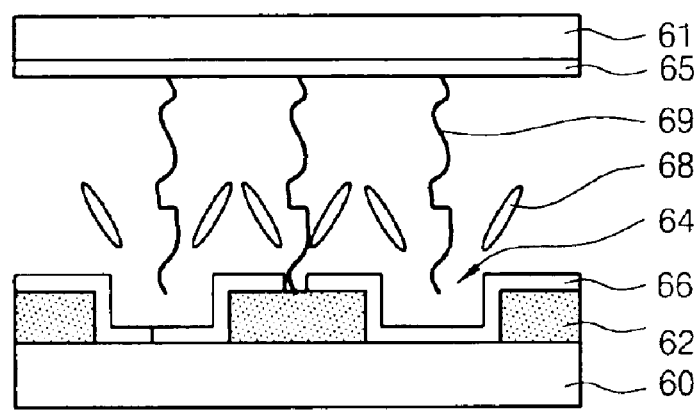
FIG. 7 is a drawing showing the alignment of liquid crystals upon the use of a conventional hole and electrode.

On the other hand, as shown in FIG. 7, if an entire portion of the hole 54 is covered with a pixel electrode 66 made of ITO, tilting sources make liquid crystals symmetrically oriented, and at the same time, disclination lines 69 will be caused at the central portion of the hole 64, thereby reducing transmittance. In FIG. 7, the reference numeral 61 designates an upper substrate, and the reference numeral 65 designates a counter electrode.

Figure 8:
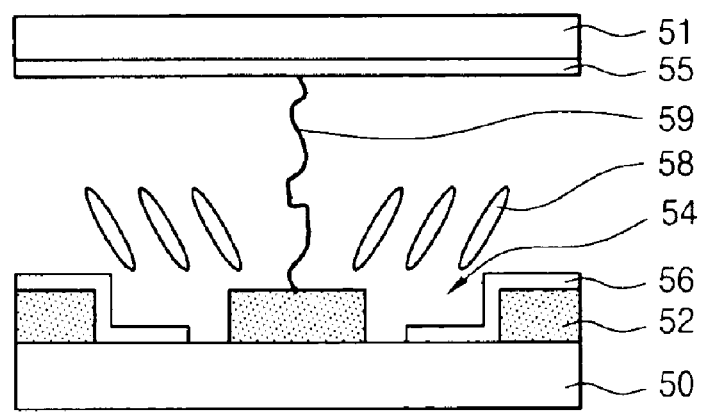
FIG. 8 is a drawing showing the alignment of liquid crystals upon the use of a hole and electrode according to the present invention.

However, as shown in FIG. 8, if only more than half of the hole 54 is covered with the pixel electrode according to the present invention, the liquid crystals 58 will be unsymmetrically oriented within the hole 54 so that disclination lines will be substantially not caused except for a disclination line caused at a slit positioned at the middle of the pixel electrode. In FIG. 8, the reference numeral 51 designates an upper substrate, and the reference numeral 55 designates a counter electrode.

Thus, when the structure of the pixel electrode is formed into a jagged shape according to the present invention, tilting sources are simply added, and also, as shown in FIG. 5B, the interval between the slits 57 is reduced to increase the area of a pixel covered with the pixel electrode, thereby increasing an area where the liquid crystals are influenced.

As a result, according to the present invention, the hole is formed in the insulating film on which the pixel electrode is formed in such a manner that it covers more than half of the hole. Thus, upon driving of the liquid crystals, an increased number of tilting sources can be generated. Also, sufficient driving of the liquid crystals within the pixel can be achieved without a need for separate tilting sources, such as protrusions or slits, on the upper substrate.

Accordingly, since the tilting sources do not need to be formed on the upper substrate, a difficulty in stably driving the liquid crystals, which is caused by insufficient assembling of the substrates, can be overcame and thus a reduction in image quality can be inhibited.

Meanwhile, in the vertical alignment mode liquid crystal display device according to the present invention, phase compensation plates may also be interposed between the polarizer and the lower substrate and between the upper substrate and the polarizer, respectively. The phase delay value (Rth) of these phase compensation plates for x, y and z directions is calculated from the following equation 1:

$$Rth=[(nx+ny)/2-nz]\times d \quad (1)$$

For example, if monoaxial phase compensation plates are used, their phase delay value (Rth) is preferably in the range of 40–800 nm, and biaxial phase compensation plates are used, their phase delay value (Rth) is preferably in the range of 150–250 nm.

Moreover, the dielectric anisotropy of the liquid crystals is preferably in the range of −2 to −10, and the thickness of the liquid crystal layer is preferably in the range of 2–6 μm. The dielectric anisotropy of the liquid crystals times the thickness of the liquid crystal layer (d×Δn) is preferably in the range of 200–500 nm.

Figure 9:
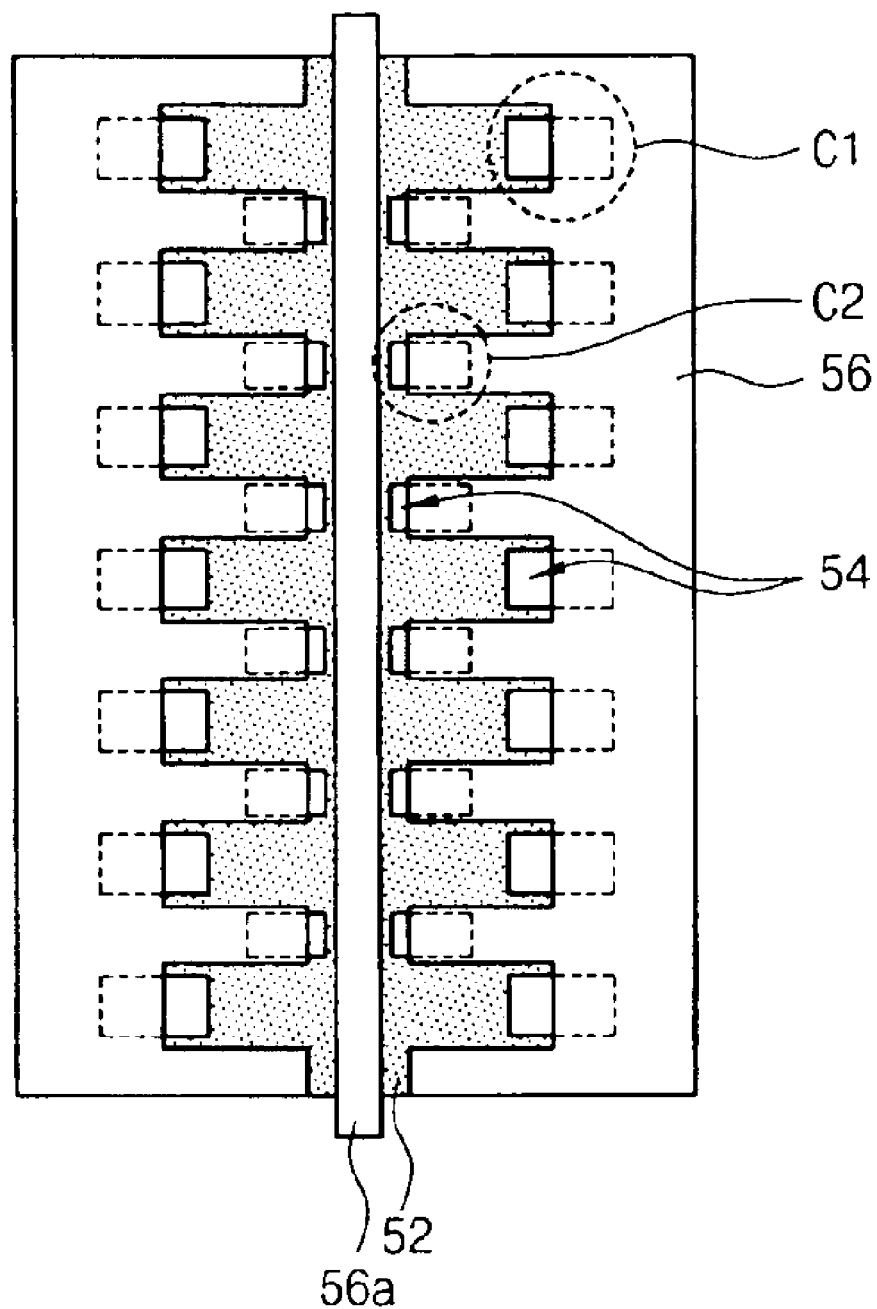
FIG. 9 is a drawing showing the structures of a hole and an electrode according to an alternative embodiment of the present invention.

FIG. 9 is a drawing illustrating the structures of a hole and an electrode according to an alternative embodiment of the present invention.

In this embodiment, the hole 54 is disposed in both of a concave portion C1 and a convex portion C2 of the jagged pixel electrode 56. In this case, tilting sources are more increased to allow the response time of the liquid crystals to be more shortened.

Moreover, a dummy line 56a is formed at the middle simultaneously with the formation of a gate or data bus line, or the pixel electrode 56, such that the same voltage as the counter voltage in the upper substrate can be applied, thereby allowing the driving of the liquid crystals to be more stable.

As described above, according to the present invention, the insulating film having the hole, and the jagged pixel electrode, are formed on the lower substrate, in such a manner that the pixel electrode covers about half of the hole. This allows the high-speed response of the liquid crystals by an increase in tilting sources. In addition, since tilting sources, such protrusions or slits, do not need to be formed on the upper substrate, a difficulty in stably driving the liquid crystals, which is caused by insufficient assembling of the substrates, can be overcame.

As a result, according to the present invention, a vertical alignment mode liquid crystal display with high-speed response, wide viewing angle, high brightness and high image quality can be realized.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A vertical alignment mode liquid crystal display device which comprises:

upper and tower substrates which are disposed opposite one another at the desired interval;

a liquid crystal layer sandwiched between the upper and lower substrates and formed of liquid crystals with negative dielectric anisotropy;

an insulating film formed on the inner surface of the lower substrate and having a rectangular or square hole formed therein;

a lagged pixel electrode which is formed on the insulating film, wherein the pixel electrode partially but not completely covers the hole;

a counter electrode which is formed on the inner surface of the upper substrate;

vertical alignment films which are interposed between the pixel electrode and the liquid crystal layer and between the counter electrode and the liquid crystal layer, respectively; and polarizers which are attached on the outer surfaces of the upper and lower substrates, respectively, in such a manner that their polarizing axes cross each other.

2. The vertical alignment mode liquid crystal display device of claim 1, wherein the hole has a height of less than 2 μm, a length of shorter side of less than 5 μm, and a wall angle of 10–90 degrees.

3. The vertical alignment mode liquid crystal display device of claim 1, wherein the pixel electrode is formed in such a manner that the ratio between a portion of the hole covered with the pixel electrode and a portion of the hole non-covered with the pixel electrode is 1:1–5:1.

4. The vertical alignment mode liquid crystal display device of claim 1, wherein the pixel electrode is formed in such a manner that the interval between two adjacent pixel electrodes is less than 10 μm.

5. The vertical alignment mode liquid crystal display device of claim 1, wherein the hole is positioned at a concave portion and another such hole is positioned at a convex portion of the jagged pixel electrode.

6. The vertical alignment mode liquid crystal display device of claim 1, which further comprises phase compensation plates interposed between the upper substrate and the adjacent polarizer and between the lower substrate and the adjacent polarizer.

7. The vertical alignment mode liquid crystal display device of claim 6, wherein the phase compensation plates are monoaxial phase compensation plates or biaxial phase compensation plates, in which the monoaxial phase compensation plates have a phase delay value ranging from 40 to 800 nm, and the biaxial phase compensation plates have a phase delay value ranging from 150 to 250 nm.

8. The vertical alignment mode liquid crystal display device of claim 1, wherein the liquid crystals have a dielectric anisotropy of −2 to.

9. The vertical alignment mode liquid crystal display device of claim 1, wherein the liquid crystal has a thickness of 2–6 μm, and the thickness of the liquid crystal layer times the refractive index anisotropy of the liquid crystals is 200–500 nm.

10. The vertical alignment mode liquid crystal display device of claim 1, wherein the liquid crystal layer come in contact with the lower substrate through the uncovered portion of the hole.

* * * * *